United States Patent [19]
Gudesen

[11] Patent Number: 5,761,607
[45] Date of Patent: Jun. 2, 1998

[54] SYSTEM FOR LOCAL PROCESSING/ ACCESSING AND REPRESENTATION OF LARGE VOLUMES OF DATA

[75] Inventor: Hans Gude Gudesen, Fredrikstad, Norway

[73] Assignee: Opticom ASA, Norway, Sweden

[21] Appl. No.: 612,345

[22] Filed: Mar. 7, 1996

[30] Foreign Application Priority Data

Sep. 8, 1993 [NO] Norway ..................... 933204

[51] Int. Cl.[6] ............... H04N 7/10; H04N 7/11; H04H 1/02; H04L 9/00
[52] U.S. Cl. ............... 455/6.2; 348/10; 348/12; 455/5.1; 380/4; 380/25
[58] Field of Search ............... 348/1, 2, 3, 5, 348/6, 7, 10, 12, 13, 5.5; 455/2, 3.1, 4.1, 4.2, 5.1, 6.1, 6.2, 6.3; 395/200.47–200.49; 380/4, 5, 23, 25; H04N 7/10, 7/14, 7/173, 1/00, 1/02

[56] References Cited

U.S. PATENT DOCUMENTS

| 4,305,101 | 12/1981 | Yarbrough et al. |
| 4,789,961 | 12/1988 | Tindall |
| 4,949,187 | 8/1990 | Cohen |
| 5,003,384 | 3/1991 | Durden et al. |
| 5,046,092 | 9/1991 | Walker et al. ............... 380/20 |
| 5,130,792 | 7/1992 | Tindell et al. |
| 5,132,992 | 7/1992 | Yurt et al. |
| 5,166,886 | 11/1992 | Molnar et al. |
| 5,457,746 | 10/1995 | Dolphin ............... 380/4 |

FOREIGN PATENT DOCUMENTS

WO 92/11713  7/1992  WIPO ............... H04H 1/02

Primary Examiner—Mark R. Powell
Assistant Examiner—John W. Miller
Attorney, Agent, or Firm—Brinks Hofer Gilson & Lione

[57] ABSTRACT

A system for transmitting films to consumers having reduced response time, an increased number of available films and improved user interactivity. The system utilizes a simple inexpensive communication system and can avoid the need to transfer data from external sources. The system also provides mechanism to prevent fraud and a simple updating mechanism. The system has the capability to process large volumes of data locally and includes an input/output interface and at least one output interface for transferring data to a playback drive.

18 Claims, 2 Drawing Sheets

SYSTEM FOR LOCAL PROCESSING/ ACCESSING AND REPRESENTATION OF LARGE VOLUMES OF DATA

PRIORITY

Priority under PCT/NO94/00148 filed Sep. 8, 1994, which designated the U.S. is hereby claimed. Priority is also hereby claimed under Norwegian patent Application No. 933,204, filed Sep. 8, 1993. The above identified PCT Application PCT/NO94/00148 is based upon Norwegian patent application Ser. No. 933,204.

BACKGROUND OF THE INVENTION

The present invention concerns a system for local processing/accessing and representation of large volumes of data, for instance in the form of a complete data library. The system comprises at least one input/output interface to one or more bandwidth-limited telecommunication networks and at least one output interface for the transfer of processed or unprocessed data to at least one playback device for display and/or playback of data. The system further comprises at least one local mass storage unit for storing said large volumes of data and connected with a decoder for processing and decoding said large volumes of data in case the latter are coded. In addition, the system comprises an internal traffic controller, a controlling mixer device connected with the decoder, a user control interface connected with said internal traffic controller, and a modem connected with said internal traffic controller and said input/output interface for two-way communication over said one or more bandwidth-limited telecommunication networks with an external control center or centers.

The invention also includes applications of the system.

The present invention provides a system for on-demand services without the use of an associated rapid and massive data transfer from an external source or external sources. A typical application is video-on-demand or VOD, i.e., services whereby the user can access a film library on request. With the present invention a VOD library can be accessed in real time without the need for on-line transfer of the selected film or films via telecommunication lines with high capacity.

The system according to the present invention makes use of a local mass storage unit in a decoder box with combined user control and external control. The storage medium or media in the storage unit may or may not be replaceable. The information which constitutes the requested services, e.g., films, can either be entirely stored locally in the system and accessed from it, or parts of the information can be stored locally, while other parts have to be retrieved from an external source or sources. In the latter case two or more data streams are subsequently mixed to form a continuous bit stream before they are displayed on, e.g., a user monitor or another display device or used in other ways. Access is conditional and will normally require authorization, invoicing, access to the correct decoder, etc.

In accordance with the state of the art VOD usually requires films to be transferred to the user via high capacity telecommunication lines for immediate display.

Three general versions of direct high capacity systems of this kind have been proposed and in some cases implemented:

Telephone Transfer Systems with Local Server and High Capacity

High capacity data transmission is employed in order to transfer information to the user from local servers and via local telephone lines and in this connection exploits the fact that simple telephone lines over short distances can handle high transfer rates. The local servers used are therefore each normally connected with 50–100 consumers and thus only employ a small part of the network. In this context user interactivity can be achieved (e.g., random access, when a film is started on the request of a user), provided that the local server can handle a sufficient number of individual requests for different films and that the local telephone network has sufficient capacity. This system, however, makes great demands on the capacity of the local server, particularly if there are a great many consumers, for example more than a thousand, who can address each server. If the capacity of the server is limited, the number of servers will have to be correspondingly high and traffic costs will generally increase substantially and constitute a disproportionately large part of the total costs.

Transfer Lines with a Central Server and High Capacity

A system of this type is similar to the first, apart from the fact that the server now has to serve the entire network or the greater part of it. In theory any user can have any film whatever from the central server started on demand. In practice, in the best case the response times for such a system will be considerable. Normally the system will very quickly reach the saturation point and break down. The demand on line capacity will also normally be prohibitive for an implementation of this kind.

Parallel, Continuous Transfer System

These employ a number of transfer lines with high capacity for continuous, parallel transfer of a number of films. A film is normally started, e.g., every n minutes and requests from the users for a specific program are then hooked on to the closest start-up. However, this does not give real user interactivity, and the user will either have to wait for a relatively long time, particularly if the number of available titles is large, or only have a limited number of titles from which to choose. If it is to be efficient this system also requires a considerable number of transfer channels or lines with high capacity.

As an example of prior art as applied to the distribution of video and/or audio information, reference will be made to U.S. Pat. No. 4,949,187 (Cohen), which discloses a video communication system which makes it possible to download a film in a digital format from a large archive data library, storing the film locally, and viewing it at any convenient time. This system makes use of a phone line for downloading data and does not allow for storing and accessing the archive data library locally, as the requested items are downloaded one at a time and temporarily stored in a disc storage system.

Further U.S. Pat. No. 5,132,992 (Yurt et al.) discloses a system for distributing video and/or audio information, the system employing digital signal processing to achieve high rates of data compression. Again, the system does not allow for storing and accessing of a large archive data library locally as the desired information items are downloaded one at a time while accessing the externally stored archive data library and then the data item downloaded is stored, e.g., for viewing in case of a video film, temporarily in a local mass storage.

Neither of these above-mentioned systems provide for a low data rate two-way communication during a normal mode of operation and presuppose a more or less permanent connection to an external data base during this normal mode of operation, while providing a temporary intermediate storage of a desired information item selected and downloaded from an external large archive data library.

SUMMARY OF THE INVENTION

Thus the known systems offer the user very limited opportunity for interactively selecting the service and for determining how and when it should be used. More precisely, therefore, the object of the present invention is to reduce the system's response time, to increase the services on offer, e.g., the number of films which are offered, to provide a high degree of user interactivity, to permit the use of a simple, inexpensive communication system and to offer the option of avoiding the need for transfer from an external source or external sources.

Further objects of the system according to the present invention are to enable a simple and easy commercial control to be achieved, to prevent fraud and finally to provide simple updating mechanisms.

The above-mentioned objects and other advantages of a system according to the present invention are achieved in that said at least one local mass storage unit comprises at least one replaceable or exchangeable storage medium for storing said large volumes of data and at least one input interface connected with said at least one local mass storage unit, wherein said input interface is adapted for physically receiving said replaceable or exchangeable storage medium, said local mass storage unit in any case being the only mass storage unit wherewith said decoder is permanently connected for accessing, retrieving and processing said large volumes of data in a normal operating mode of the system, wherein said large volumes of data or part thereof are transferred from said mass storage unit either via said decoder for decoding or via said controlling mixer device to said output interface for display and/or playback on said playback device, said internal traffic controller being connected with said local mass storage unit for controlling the retrieval of data as selected over said user control interface and further via said modem handling the two-way communication with said external control center for transmitting or receiving information over said at least one input/output interface on said one or more bandwidth-limited telecommunication networks, said information being restricted to information for authorization, validation and debiting which in any case requires a low data transfer capacity in the course of a normal operation of the system as enabled and controlled from said user control interface, the system thus providing local accessing/retrieval of said large volumes of data or parts thereof, without recourse to or need for downloading or accessing any external databases, as said large volume of data may form a self-contained, permanently and locally stored data library which may be entered in the system in a once-through operation via said input interface.

BRIEF DESCRIPTION OF THE DRAWINGS

The invention will now be explained in more detail in connection with an embodiment and the attached drawings, in which.

DETAILED DESCRIPTION OF THE PREFERRED EMBODIMENT

The system will now be described with reference to a system for user-selected display of films on the user's television set, but limited to situations where either the transfer system's bandwidth is limited or not available at all. It should be understood, however, that the system according to the invention can equally well be used in other user-selected applications of large volumes of data, for example user-selected, but authorized, invoiced or conditional use of other forms of image data or image-like data, including consumer-adapted or professional use of geographical, lexical and encyclopedic data or marketing data, consumer-oriented or professional exploitation of medical or technical image data bases and consumer-oriented utilization of video/ computer games. The system according to the present invention can also be used in applications of large volumes of data which are not image data, but, e.g., sound, including speech and music. Finally the system according to the present invention can be aimed at user-orientated applications of any mixture of large volumes of data which comprise image data, image-like data or data which are not images.

Figure 1A:
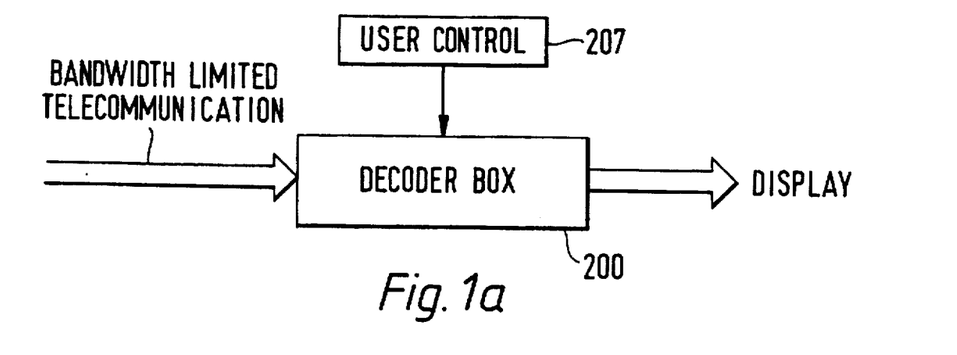
FIG. 1A illustrates a decoder box with user control as used in the system according to the present invention.
Figure 1B:
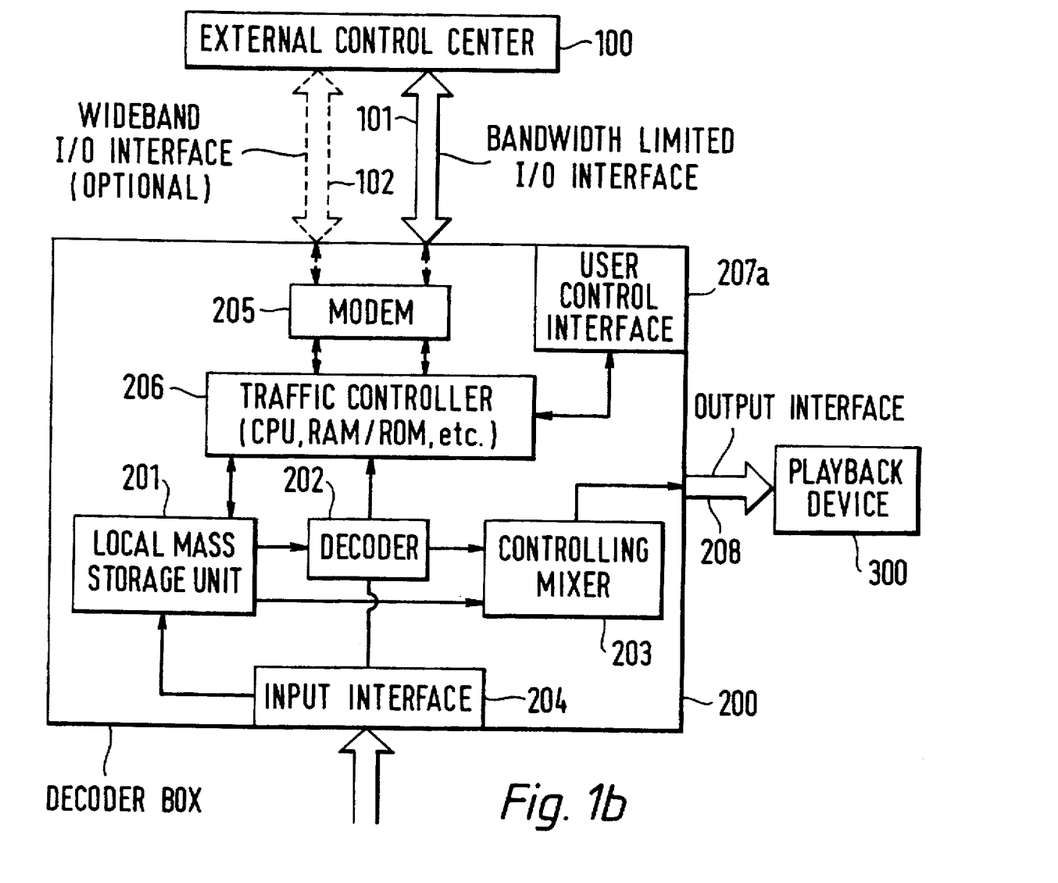
FIG. 1B illustrates the system according to the present invention.

FIG. 1A illustrates schematically the use of a decoder box 200 according to the present invention. In this context the term decoder box describes the local unit which is at the user's disposal and will as shown in FIG. 1B comprise one or more local mass storage units 201, an internal traffic-controller 206, modem 203, decoder 202, interfaces 101, 102, 204, 207a, 208, etc. The decoder 202 is the unit which decodes the encoded data received. The local mass storage unit 201 is a unit provided in the decoder box and is capable of storing large volumes of data, typically from 500 Mbit up to 100 Gbit or more. The actual storage medium is the physical medium in the mass storage unit which, for example in the case of VOD, stores film data. In this context the storage medium can be one or more of the following, viz. disks, cards, tapes or combinations of these.

The encoded data are composed of data which are represented in some kind of symbolic form, for example in order to protect the contents of a given data stream, or reduce its size or represent it in a more efficient manner, for example in order to obtain faster random access, faster read-out, etc. Examples of coding may be, e.g., encryption, compression, etc.

As illustrated in FIG. 1A, the decoder box 200 should enable the user to display, for example, various films by means of a user control 207, a rapid response being obtained on the user control 207 with the system according to the present invention, despite the fact that the telecommunication connection with the outside world is bandwidth-limited.

FIG. 1B illustrates the fundamental design of the system according to the present invention and the more detailed design of the decoder box 200 in block diagrammatic form. The decoder box 200 has an input interface 204 which can be connected with some form of external signal source and which transmits signals from there to a decoder 200. The decoder 202 is connected via an internal traffic controller 206 with a local mass storage unit 201. This mass storage unit 201 may include one or more replaceable or optionally also non-replaceable storage media and if the storage medium is replaceable, in reality the input interface 204 corresponds to an input device for this storage medium. The decoder 202 is further connected with a controlling mixer device 203 and via this with a user control interface 207a and an output interface 208 respectively to a playback device 300 for reproduction of the source signals which are input via the input interface 204. If the data on the storage medium exist in encoded form, they are retrieved from the local mass storage unit 201 and decoded in the decoder 202 before being transferred to the playback device 300 under the control of the user control interface 207. Furthermore, the decoder box 200 can have input/output interfaces which are illustrated here as a bandwidth-limited and a wide-band interface 101, 102 respectively, both of which lead to an external control center 100. It should be understood that there can be several such interfaces and that they can lead to different control centers. Via the user control interface 207a a two-way communication can take place over the traffic controller 206 with the external control center 100 via the input/output interfaces 101, 102, these being connected with the traffic controller 206 via a modem 205. Thus the user control interface 207a controls the user's communication with external control centers 100 as well as the utilization of the information stored in the decoder box's mass storage unit 201. By means of the user control interface 207a, at the request of the user a desired item of service information can be transferred which, for example, can be stored in a data base connected with the external control center 100. In a VOD service this data base will be a film library. The service information is transferred via the interfaces 101, 102 in encoded or uncoded form. If large volumes of data have to be transferred via the bandwidth-limited interface 101, this will generally require the data to be compressed, particularly in the case of films which have to be transferred on a bandwidth-limited line. The service information can also optionally be transferred on a wide-band network, e.g., satellite lines or microwave lines via the wideband interface 102. The decoder box in FIG. 1B therefore gives the user a number of options for the input and updating of service information. For local storage of data and low-capacity transfer, two-way bandwidth-limited input/output interfaces 101 are used which in FIG. 1B also represent the transfer line to an external control center 100. User control data and user identification data from the user's decoder box 200 are transferred on the two-way transfer line with low capacity to this external control center 100. These data can be used for authorization, invoicing, display control, etc. Further control data and authorization are transferred on the same bandwidth-limited transfer line from the external control center 100 to the decoder box 200. These data can be used to initiate and maintain a selected film showing.

The additional control data from the external control center 100 can contain key information, codes and data without which the controlling mixer device 203 cannot utilize data from the local mass storage unit 201. This is in order to prevent fraud and various forms of illegal exploitation. The additional control data can, e.g., comprise smaller, but important parts of the information or the film and different types of encrypted key information corresponding to the user identification, an identifier for the local mass storage unit 201, special identifiers for the contents of the local mass storage unit and the external control center 100, etc.

The external control center 100 can be connected to a data base for the transfer of the desired information or data, e.g., films, from a film library which in this case constitutes the data base for the users. The network can optionally be bandwidth-limited and equivalent to the telephone network or a cable network with low capacity. In this case it could correspond to the communication line between the decoder box 200 and the external control center 100. The data base, e.g., the film library, could also be connected to the decoder box 200 via a wide-band network, e.g., a satellite network, while the control information between the user and the external control center 100 is transferred on a bandwidth-limited line.

The data which are transferred from the user control interface 207a in the system in FIG. 1B will consist of requests to the external control center 100 together with user control data for control of the local display unit as soon as the desired service information has been authorized and initiated.

The system according to the present invention can also be used for VOD with local storage, but without external communication. The VOD concept can in fact be implemented without the necessity of accessing an external control center. In this case the desired service information, for example all films, will be located in the decoder box 200, viz. stored in the local mass storage unit 201. User access and invoicing can be initiated, e.g., via credit card or similar means of payment, but can also be implemented by the payment of a one-time fee when a medium which contains the films is purchased, after which no further invoicing, authorization, etc. will be necessary. By means of this concept it becomes possible to place restrictions on use, for example in the form of a limit on the number of times a film can be played.

Figure 2:
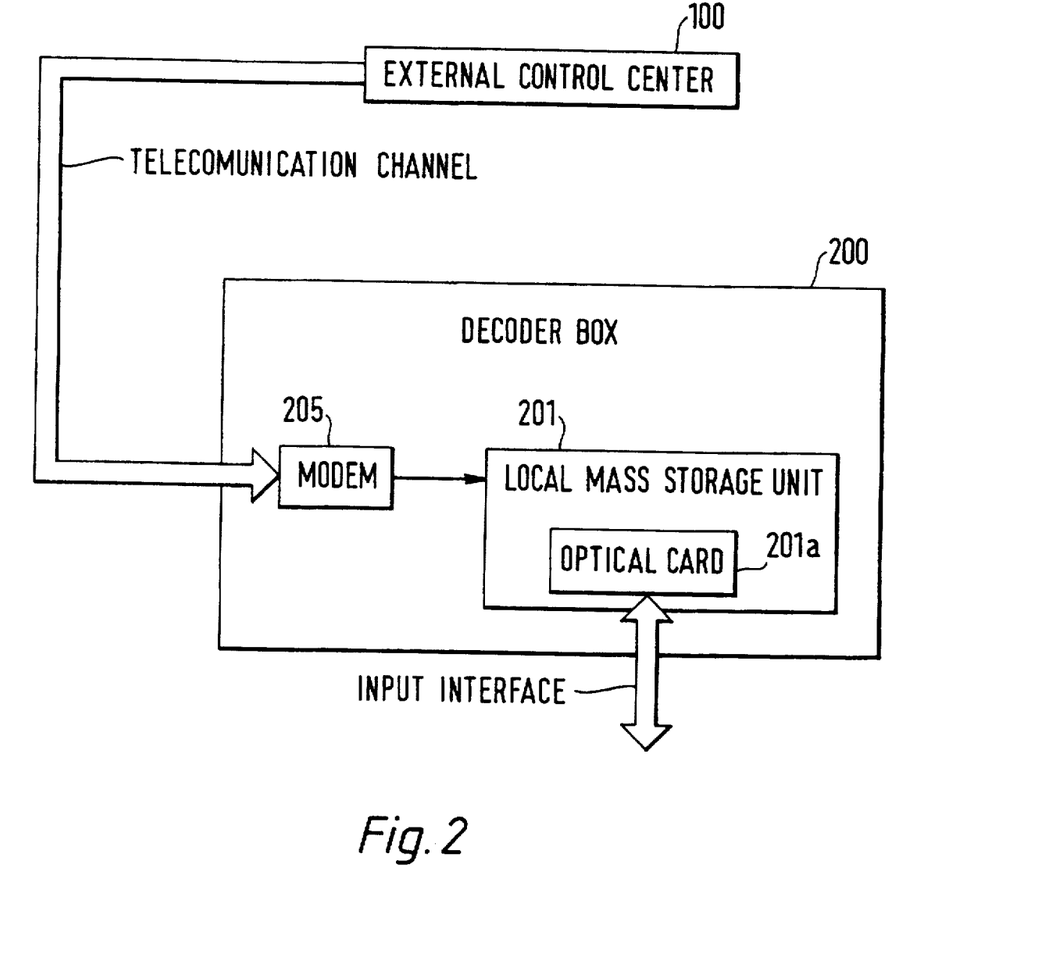
FIG. 2 illustrates an updating of the information in a local mass storage unit in the system according to the present invention.

The local mass storage unit can be updated in different ways and this is schematically illustrated in FIG. 2.

The local mass storage unit or units 201 can, e.g., be updated by physically replacing the unit or units. This can involve replacing the entire storage unit 200 or be limited to the replacement of the storage medium or media 201a, here shown as an optical card.

Updating can also be performed by means of an electronically implemented modification/updating of locally stored data via the telecommunication network and under the control of the external control center 100. The electronic modification/updating can be performed off-line, and thus will not interfere with the current user-selected utilization of service information, and will take into consideration those possibilities which exist in the commercial telecommunication network, while at the same time taking into account consumer preferences. Electronic updating can be performed in each case by transferring encoded or unprocessed data via telephone lines with low capacity, telephone lines with higher capacity, satellite lines, cable networks, radio lines, etc. under the control of the external control center 100.

According to what is expedient in connection with the updating, the storage medium or media 201a used in the local mass storage unit 201 can be permanent or also writable or erasable.

In this context the local mass storage unit can employ media 201a such as magnetic tape, rotating optical, magneto-optical, electro-optical or magnetic discs or non-rotating optical or magnetic cards and chips for storing the service information, for example the films. These can exist in more or less compressed form in order to reduce storage requirements or intact, i.e., uncompressed, but stored in a format which optimizes search time, read-out speed, etc.

Such storage media 201a are particularly suitable for VOD services with a pay-per-view arrangement, and the storage media 201a can then be replaceable in order to prevent wear and also in order to be replaced with a new item of service information, for example new films.

Service information such as stored films can be physically updated by replacing the storage medium or media 201a with new ones or by transferring the service information, i.e., the films, via existing telecommunication networks, e.g., via satellite lines, cable networks, telephone lines and microwave lines, preferably during periods of low traffic density in order to minimize the transfer costs. The actual system according to the invention can be controlled by using ordinary telephone connection with a low bit rate between the user decoder 200 box and the external control center 100.

As already stated, the system according to the present invention offers a great many advantages when used for VOD services. From the user's point of view the system according to the present invention has a very fast response time, since the lead time from the selection of a film until the display of the film starts normally only constitutes a few seconds, and this is of vital importance when comparison is made with parallel continuous transfer systems for VOD. At the same time the system according to the present invention gives the user access to an enormous number of films, since the system according to the invention offers the possibility of accessing libraries with hundreds of film titles or more in the course of seconds, while known VOD services at present normally have the capacity to offer 1030 films.

The system according to the present invention permits a high level of interactivity, since the local storage system not only enables the user to start a desired film with a very short start-up time, but can also give the user the possibility for freeze frame, fast forward and rewinding of the film and all the other functions which can normally be provided by today's video recorder systems. Other forms of interactivity can also be implemented, and range over everything from simple color adjustment to editing possibilities for an entire film or editing of local features in scenes and interactive games, etc., depending on which code technique is used.

The system according to the present invention requires a simple and inexpensive communication system, since a real time communication system with high capacity is not necessary. Nor is it necessary to have special tuning and central or local server technology, nor to be continuously linked to a high capacity transmission system. In principle an ordinary dial-up, analog telephone line on 3.4 kHz is all that is required in order to achieve the desired communication with the system according to the present invention. The computer system in the external control center 100 which serves a large number of customers can be simple and low cost, since only small volumes of data have to be transferred to each user or customer.

If an option is selected in which there is no need for transfer from external sources, in principle the whole film library can be stored locally, thus completely eliminating the need for expensive real time transfers from external sources such as film libraries.

For the commercial exploitation of the system according to the present invention it is an advantage that low capacity transfer via, e.g., telephone lines facilitates the user identification and permits automatic invoicing from the external control center. At the same time the system according to the present invention offers the possibility of implementing comprehensive security measures in order to protect the supplier's interests by preventing the exploitation of VOD services and the like with fraudulent intent, e.g., through illegal copying of programs or pirate production of decoders, etc.

Finally the system according to the present invention can be installed and reprogrammed without the need for it to function in real time, since it is possible to use a number of updating techniques, varying from inexpensive read-only media to writable media which can be electronically updated via practically all existing communication lines and networks.

Even though the system according to the present invention is particularly well suited to VOD services with a pay-per-view arrangement, and the design is described with special reference to this, it is in no way restricted to such applications, but on the contrary can be used to handle all other forms of service information where the use of local mass storage units for permitting rapid, controlled access to and read-out of massive volumes of data is especially appropriate and desirable, with simultaneous local user control and optional external authorization and control, above all in situations where there are technical and/or commercial restrictions on the transfer bandwidth. At the same time data can be stored locally in full measure, although this is not necessary, and can in each case be supplemented with items of key and control information, which again can optionally include fraud protection, authorization data or additional data such as, e.g., key program information.

The locally stored data can be stored in more or less encoded format, i.e., the system can handle both preprocessed and unprocessed information, and the encoded formats can, e.g., be based on standard video codecs, model-based compression systems, etc. At the same time the storage of the locally stored data can aim at achieving normal search time, read-out speed, display functionality, etc. The local mass storage unit can be employed in most examples of the prior art for storage of large volumes of data, with storage media which can be permanent or writable and erasable. Moreover as already stated, the local mass storage units can by physically removed or replaced or be installed on a non-replaceable, permanent basis. Nor is the system according to the present invention limited to the use of today's known media for mass storage of data, but will be capable of being adapted to future storage systems which provide greater storage density and faster access or both than state of the art mass storage technology.

Finally it should be mentioned that if in the system according to the present invention service information is used which is preprocessed, e.g., with coding techniques for compression, and especially model-based compression, a decoder can be employed which permits different forms of processing of the stored data, for example interpolation, prediction and the like in connection with the decoding. This means that the service information which exists in some kind of standardized format and encoded by means of an appropriate technique, can be converted into other formats which enable display and playback to be performed with a higher quality than the reproduction on the basis of the source program's original standard would permit. This can be of special importance if, e.g., television and video standards with a higher quality than those at present should be adopted in the course of the coming years.

What is claimed is:

1. A system for local processing/accessing and representation of large volumes of data, in the form of a complete data library, wherein the system comprises at least one input/output interface (101) to one or more bandwidth-limited telecommunication networks and at least one output interface (208) for the transfer of processed or unprocessed data to at least one playback device (300) for display and/or playback of data, at least one local mass storage unit (201) for storing said large volumes of data and connected with a decoder (202) for processing and decoding said large volumes of data in case the latter are coded, an internal traffic controller (206), a controlling mixer device (203) connected with the decoder (202), a user control interface (207a) connected with said internal traffic controller (206), and a modem (205) connected with said internal traffic controller (206) and said input/output interface (101) for two-way communication over said one or more bandwidth-limited telecommunication networks with an external control center or centers (100), characterized in that said at least one local mass storage unit (201) comprises at least one replaceable or exchangeable storage medium (201a) for storing said large volumes of data and at least one input interface (204) connected with said at least one local mass storage unit (201), wherein said input interface (204) is adapted for physically receiving said replaceable or exchangeable storage medium (201a), said local mass storage unit (201) in any case being the only mass storage unit wherewith said decoder (202) is permanently connected for accessing, retrieving and processing said large volumes of data in a normal operating mode of the system, wherein said large volumes of data or part thereof are transferred from said mass storage unit (201) either via said decoder (202) for decoding or via said controlling mixer device (203) to said output interface (208) for display and/or playback on said playback device (300), said internal traffic controller (206) being connected with said local mass storage unit (201) for controlling the retrieval of data as selected over said user control interface (207a) and further via said modem (205) handling said two-way communication with said external control center (100) for transmitting or receiving information over said at least one input/output interface (101) on said one or more bandwidth-limited telecommunication networks, said information being restricted to information for authorization, validation and debiting which in any case requires a low data transfer capacity in the course of a normal operation of the system as enabled and controlled from said user control interface (207a), the system thus providing local accessing/retrieval of said large volumes of data or parts thereof, without recourse to or need for downloading or accessing any external databases, as said large volumes of data may form a self-contained, permanently and locally stored data library which may be entered in the system in a once-through operation via said input interface (204).

2. A system according to claim 1, characterized in that the system further comprises at least one non-replaceable or permanent storage medium.

3. The use of a system according to claim 2, in a video-on-demand (VOD) service with cash, all-included payment or pay-per-view.

4. The use of a system according to claim 2, in a general information supplying system with payment on ordering or payment per item, document or file.

5. A system according to claim 1, characterized in that said decoder is connected via an additional input/output interface (102) with the external control center (100) via a telecommunication system with substantial data transfer capacity.

6. The use of a system according to claim 5, in a video-on-demand (VOD) service with cash, all-included payment or pay-per-view.

7. The use of a system according to claim 5, in a general information supplying system with payment on ordering or payment per item, document or file.

8. A system according to claim 1, characterized in that said local mass storage unit (201) is optionally implemented by one or more of the following types of replaceable or exchangeable storage media (201a): magnetic memories, semi-conductor memories, optical memories, magneto-optical memories or electro-optical memories with a typical storage capacity in the range of 500 Mbit–100 Gbit.

9. A system according to claim 8, characterized in that said replaceable or exchangeable storage medium (201a) is of the once-only type or permanent.

10. The use of a system according to claim 9, in a video-on-demand (VOD) service with cash, all-included payment or pay-per-view.

11. The use of a system according to claim 9, in a general information supplying system with payment on ordering or payment per item, document or file.

12. A system according to claim 4, characterized in that said replaceable or exchangeable storage medium (201a) is writable or erasable.

13. The use of a system according to claim 12, in a video-on-demand (VOD) service with cash, all-included payment or pay-per-view.

14. The use of a system according to claim 12, in a general information supplying system with payment on ordering or payment per item, document or file.

15. The use of a system according to claim 8, in a video-on-demand (VOD) service with cash, all-included payment or pay-per-view.

16. The use of a system according to claim 8, in a general information supplying system with payment on ordering or payment per item, document or file.

17. The use of a system according to claim 1, in a video-on-demand (VOD) service with cash, all-included payment or pay-per-view.

18. The use of a system according to claim 1, in a general information supplying system with payment on ordering or payment per item, document or file.

* * * * *

UNITED STATES PATENT AND TRADEMARK OFFICE
CERTIFICATE OF CORRECTION

PATENT NO. : 5,761,607
DATED : June 2, 1998
INVENTOR(S): Hans Gude Gudesen

It is certified that error appears in the above-identified patent and that said Letters Patent is hereby corrected as shown below:

The title page, showing an illustrative figure, should be deleted and substitute therefor the attached title page.

Delete Drawing Sheet 1, and substitute therefor the Drawing Sheet consisting of Figs. 1a and 1b, as shown on the attached page.

On the title page, item [73], delete "Sweden".

In column 1, line 28, after "connected" insert --respectively--.

In column 1, line 29, after "controller" and before the "," insert --and the controlling mixer device--.

In column 3, line 44, delete "thus" and insert in its place --being adapted for--.

In column 3, line 48, delete "may form" and insert in its place --forming--.

In column 4, line 24, change "203" to --205--.

UNITED STATES PATENT AND TRADEMARK OFFICE
CERTIFICATE OF CORRECTION

PATENT NO. : 5,761,607
DATED : June 2, 1998
INVENTOR(S): Hans Gude Gudesen

It is certified that error appears in the above-identified patent and that said Letters Patent is hereby corrected as shown below:

In column 6, line 24, change "200" to --201--. bstitute therefor

In column 8, line 64, after "connected" insert --respectively--, and after "(206)" before "," insert --and the controlling mixer device (203)--.

In column 9, line 30, delete "thus" and insert in its place --being adapted for--.

In column 9, line 33, delete "as".

In column 9, line 34, delete "may form" and insert in its place --forming--.

Signed and Sealed this

Tenth Day of August, 1999

Attest:

Q. TODD DICKINSON

*Attesting Officer*   *Acting Commissioner of Patents and Trademarks*

United States Patent [19]

Gudesen

[11] Patent Number: 5,761,607
[45] Date of Patent: Jun. 2, 1998

[54] SYSTEM FOR LOCAL PROCESSING/ACCESSING AND REPRESENTATION OF LARGE VOLUMES OF DATA

[75] Inventor: Hans Gude Gudesen, Fredrikstad, Norway

[73] Assignee: Opticom ASA, Norway, Sweden

[21] Appl. No.: 612,345

[22] Filed: Mar. 7, 1996

[30] Foreign Application Priority Data

Sep. 8, 1993 [NO] Norway .................................. 933204

[51] Int. Cl.⁶ .................... H04N 7/10; H04N 7/11; H04H 1/02; H04L 9/00
[52] U.S. Cl. .................... 455/6.2; 348/10; 348/12; 455/5.1; 380/4; 380/25
[58] Field of Search ................. 348/1, 2, 3, 5, 348/6, 7, 10, 12, 13, 5.5; 455/2, 3.1, 4.1, 4.2, 5.1, 6.1, 6.2, 6.3; 395/200.47–200.49; 380/4, 5, 23, 25; H04N 7/10, 7/14, 7/173, 1/00, 1/02

[56] References Cited

U.S. PATENT DOCUMENTS

| | | |
|---|---|---|
| 4,305,101 | 12/1981 | Yarbrough et al. |
| 4,789,961 | 12/1988 | Tindall |
| 4,949,187 | 8/1990 | Cohen |
| 5,003,384 | 3/1991 | Durden et al. |
| 5,046,092 | 9/1991 | Walker et al. ............. 380/20 |
| 5,130,792 | 7/1992 | Tindell et al. |
| 5,132,992 | 7/1992 | Yurt et al. |
| 5,166,886 | 11/1992 | Molnar et al. |
| 5,457,746 | 10/1995 | Dolphin ....................... 380/4 |

FOREIGN PATENT DOCUMENTS

WO 92/11713  7/1992  WIPO .................. H04H 1/02

*Primary Examiner*—Mark R. Powell
*Assistant Examiner*—John W. Miller
*Attorney, Agent, or Firm*—Brinks Hofer Gilson & Lione

[57] ABSTRACT

A system for transmitting films to consumers having reduced response time, an increased number of available films and improved user interactivity. The system utilizes a simple inexpensive communication system and can avoid the need to transfer data from external sources. The system also provides mechanism to prevent fraud and a simple updating mechanism. The system has the capability to process large volumes of data locally and includes an input/output interface and at least one output interface for transferring data to a playback drive.

18 Claims, 2 Drawing Sheets

Fig. 1a

Fig. 1b